Figure 1:
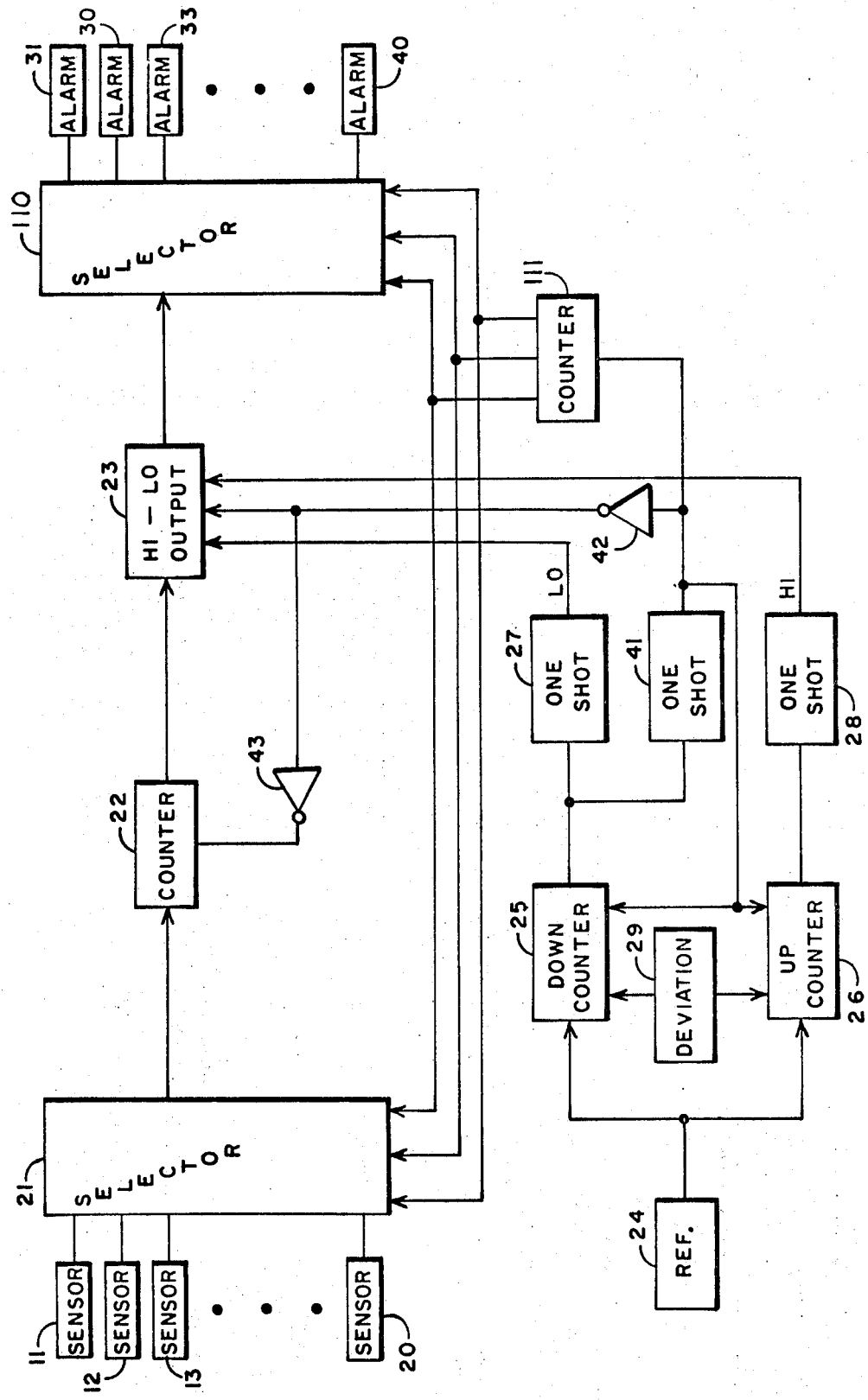
Figure 2:
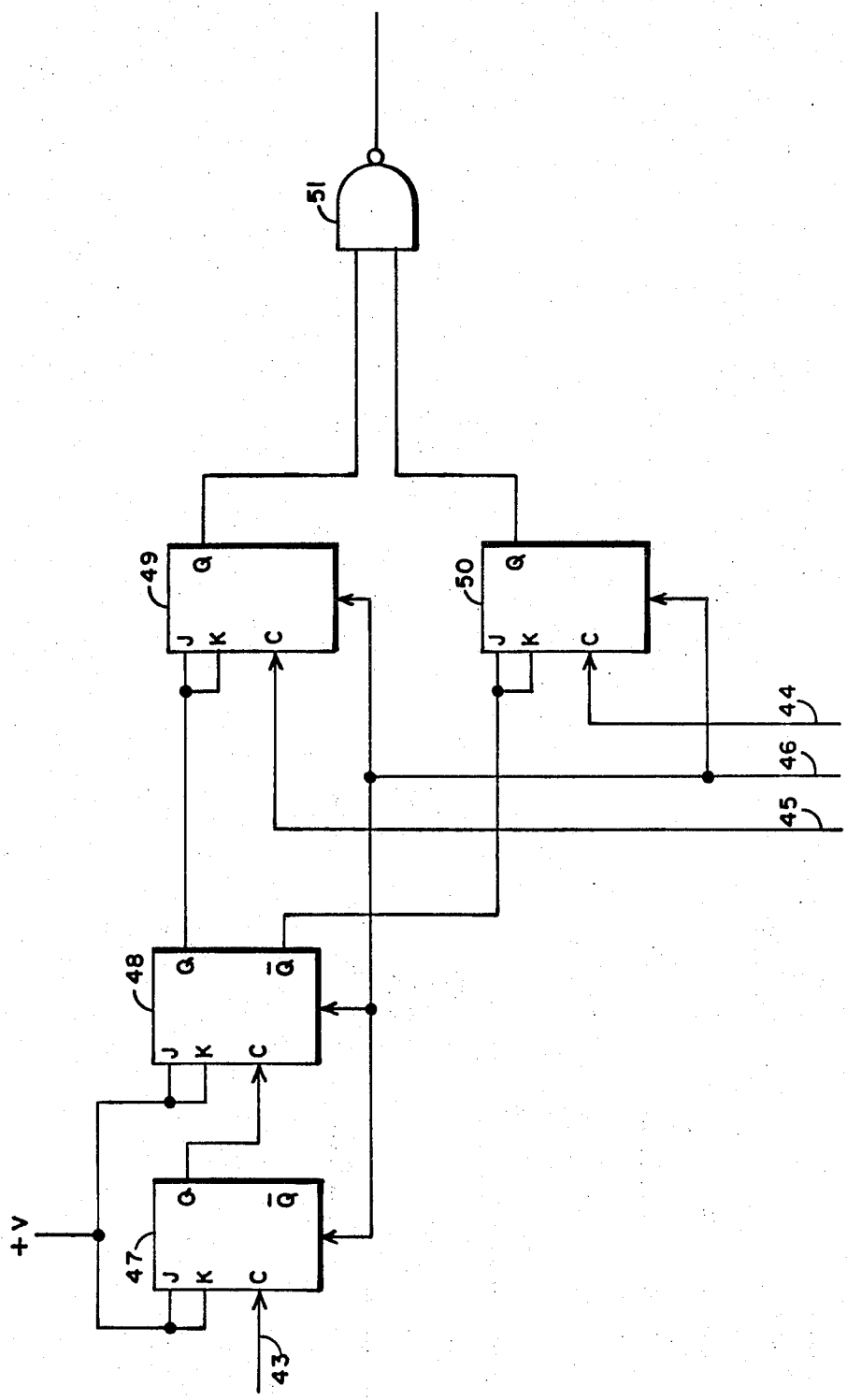
Figure 3:
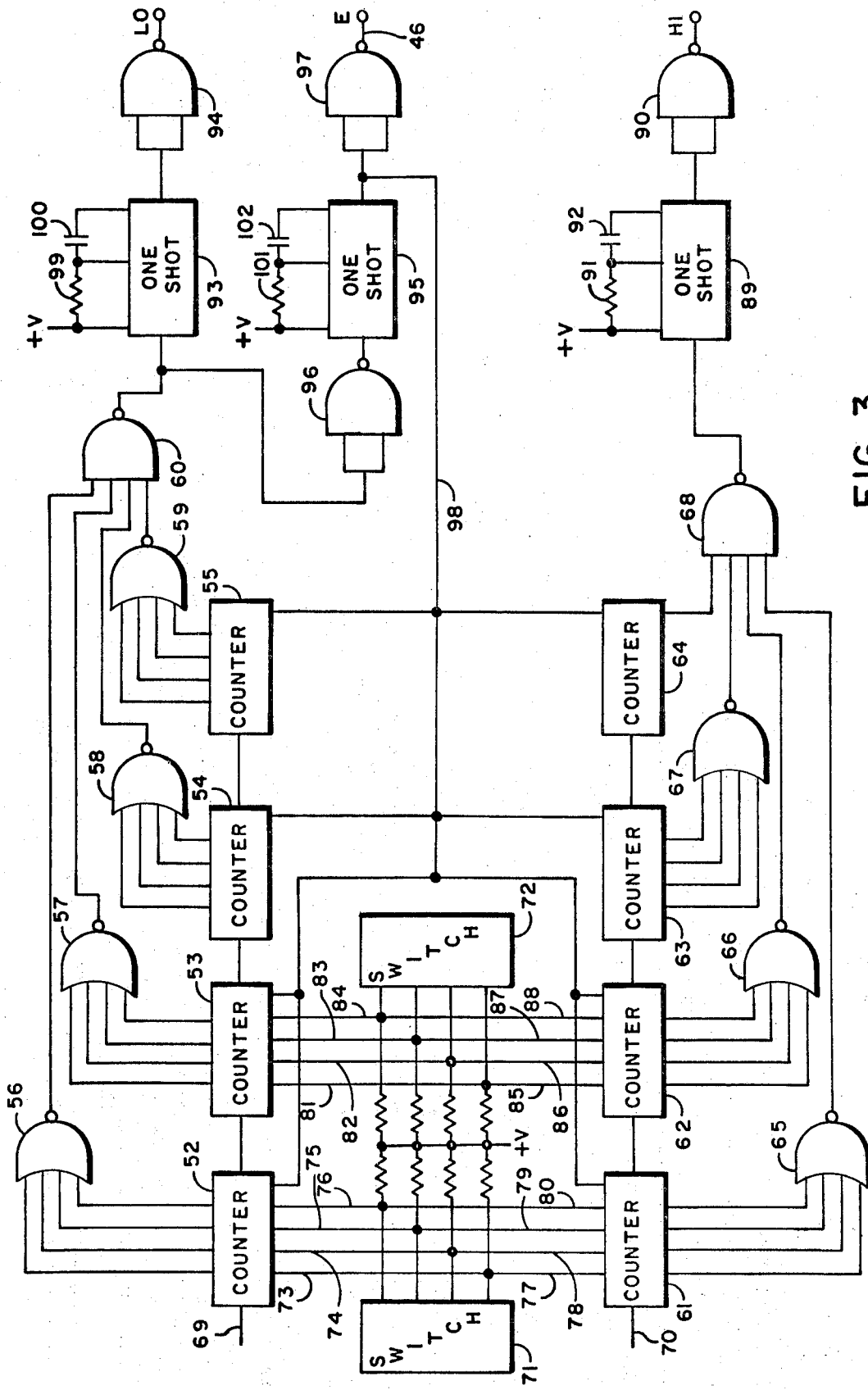

United States Patent [19]
Ratz

[11] 3,792,460
[45] Feb. 12, 1974

[54] SHAFT SPEED MONITORING CIRCUIT
[75] Inventor: James W. Ratz, Bloomington, Minn.
[73] Assignee: Honeywell Inc., Minneapolis, Minn.
[22] Filed: Oct. 13, 1972
[21] Appl. No.: 297,568

[52] U.S. Cl............. 340/271, 324/186, 340/248 P, 340/263
[51] Int. Cl. .......................................... G08b 21/00
[58] Field of Search. 340/271, 263, 248 P; 324/181, 324/186

[56] References Cited
UNITED STATES PATENTS
| | | | |
|---|---|---|---|
| 3,350,580 | 10/1967 | Harrison.......................... | 340/248 P |
| 3,496,462 | 2/1970 | Maniere et al...................... | 324/186 |
| 3,500,375 | 3/1970 | Klimo ............................ | 340/271 X |
| 3,636,545 | 1/1972 | Boyd et al........................ | 340/271 X |
| 3,691,524 | 9/1972 | Frost et al....................... | 340/263 X |

Primary Examiner—David L. Trafton
Attorney, Agent, or Firm—Lamont B. Koontz; Trevor B. Joike

[57] ABSTRACT

A shaft speed monitoring system comprises a plurality of sensors for sensing the speeds of a plurality of shafts, each sensor producing output pulses the frequency of which is determined by the rate at which its associated shaft rotates, a reference pulse source, a comparator circuit, a selector circuit for selecting a particular sensor such that the comparison circuit can compare the output from the selected sensor to the output of the reference pulse source and a second selector circuit for connecting one of the alarm circuits with its associated sensor for displaying an alarm condition.

8 Claims, 3 Drawing Figures

3,792,460

SHAFT SPEED MONITORING CIRCUIT

REFERENCE TO COPENDING APPLICATION

This application relates to subject matter disclosed in application Ser. No. 298,147 filed Oct. 16, 1972.

BACKGROUND OF THE INVENTION

Sensing the speed at which a shaft rotates is known to be old in the prior art. However, the prior art systems are inflexible insofar as they fail to provide a simple digital approach to the automatically selected sensing of rotating shafts. They also fail to provide for automatically selecting one of a plurality of shafts to be sensed and one of a plurality of alarms for energization should its associated selected sensor be in alarm condition.

The need for automatically sensing the speeds of plural shafts is quite apparent. For example, in the textile industry, machines for processing yarns have a great many spindlettes thereon for providing a twist in the yarn. If the twist is not uniform throughout the yarn, the subsequent dying of the yarn will result in an uneven color along the length of the yarn. The invention, when used in conjunction with such a textile processing machine, will provide an alarm if one or more of the spindlettes are rotating at an improper speed.

SUMMARY OF THE INVENTION

The invention includes a means for digitally sensing the speed of rotation of a shaft, comparing the speed with a reference, and providing an alarm signal which will be indicative of improper operation of the shaft. The invention further includes means to digitally sense a plurality of automatically selected shafts and, if a malfunction occurs, to provide an individual alarm indication for each shaft that has malfunctioned. Another feature of the invention is to provide an alarm if the shaft speed is operating either above or below the reference.

A still further feature of the invention is to provide an alarm indication if the sensor indicates that the shaft is operating at a predetermined percentage above or below the reference level.

These and other features of the invention will become apparent from a detailed consideration of the invention in which:

FIG. I is a schematic diagram of the invention;

FIG. II is a detailed circuit diagram of the J-K flip-flops of counter 22 and the Hi-Lo output circuit of FIG. I;

FIG. III is a detailed schematic diagram of the reference pulse source comprising the up and down counters and one shots shown in FIG. I.

In FIG. I, there are shown a plurality of sensors 11–20 for sensing the speeds of their associated rotating shafts. The sensors may be magnetic pulse pick-up units or photoelectric sensors designed to provide two pulses per revolution of its associated shafts. Each of the sensors is connected to a selector circuit 21 which will pass the pulses from a selector sensor to counter 22. This counter will provide an output signal or sensor signal after it has received a predetermined number of input pulses, for example, 2,000 input pulses. The output from the counter is supplied to Hi-Lo circuit 23.

A reference sensor means 24 acts as a reference pulse source and may comprise a magnetic pulse pick-up unit or a photoelectric sensor means designed to provide at least one pulse per rotation of a reference shaft. The reference shaft may be driven by the same source as drives the shafts associated with sensors 11–20. The output pulses from the reference sensor 24 are supplied to a down counter 25 and an up counter 26. Afer a predetermined number of input pulses, e.g. 1,000, each counter 25 and 26 will supply an output signal to an associated one shot multivibrator circuit 27 and 28 which will supply, in turn, respective pulses or reference signals to the circuit 23. It will be noted here that, if the system is operating properly, the sensors 11–20 will produce 2,000 pulses in the same amount of time as reference source 24 will produce 1,000 pulses. A deviation circuit 29 is included to provide a preset percentage of error which is allowed to exist between the selected sensor output and the reference output. For example, if deviation circuit 29 is set at 52, the down counter, as adjusted by the deviation means 29, will provide an output pulse after receiving 1,052 input pulses. On the other hand, the up counter, as adjusted by the deviation means 29, will produce an output pulse upon receiving 948 input pulses.

Because the alarm itself fails to distinguish between a fast or slow shaft rotation, the system in copending application Ser. No. 298,147 filed Oct. 16, 1972 shows a means to so distinguish.

The circuit 23 will compare the pulse from counter 22 with the pulses from counters 25 and 26 and will provide an output signal to an appropriate alarm indicator if the error signal from counter 22 does not, in time, fall between the pulses from counters 25 and 26. Specifically, if the pulse originating from up counter 26 and one shot 28 occurs after the signal from counter 22, the selected shaft is turning at a rate faster than established by the reference comprising the reference counter 24, the up counter 26 and one shot 28. Under this condition, circuit 23 will provide an output pulse to an appropriate alarm circuit. On the other hand, if the down counter 25 and one shot multivibrator 27 provides its pulse prior to the occurrence of the signal from counter 22, the circuit 23 will provide a signal to an appropriate alarm indicator.

The error output signal from the Hi-Lo circuit 23 is connected through a selector 110 to an alarm means comprising alarm indicators 31–40 associated with the selected sensors 11–20. The selectors 21 and 110 are operated in unison from a counter 111 such that the selected sensor will always be operated in unison with its associated alarm indicator.

Since the reference signal originating from the down counter 25 and one shot multivibrator 27 is the last reference signal to occur, this signal is used for the purpose of resetting all of the counters and switches and stepping the counter 111 to disconnect the previously selected sensor-alarm pair and step to the next sensor-alarm pair. The signal from down counter 25 is connected to a one shot multivibrator 41 to provide a delayed reset signal. This signal is connected to the input of counter 111, is connected through an inverter 42(a) to reset the Hi-Lo circuit 23 and (b) to reset counter 22 through an inverter 43, and is connected to both the down counter 25 and up counter 26 to reset these counters.

The counter 22 may comprise three counters under the type number 7490 which, when connected together and to flip-flops 47 and 48 (FIG. II), will yield an output pulse upon receiving, for example, 2,000 input pulses. This type number and all subsequent type numbers are the standard industry type numbers. The selector circuits 21 and 110 can be obtained under the type numbers 74151 and 74155 respectively. The counter 111 can be obtained under the product number 7493.

The Hi-Lo circuit 23 is shown in greater detail in FIG. II. The sensor signal from the three counters of counter 22 is received on line 43, the reference signal from one shot multivibrator 28 is received on line 45 and the reference signal from one shot multivibrator 27 is received on line 44. The reset signal is supplied to the Hi-Lo circuit 23 from inverter 42 over line 46.

The signal from the three counters of counter 22 is supplied over line 43 to the clock terminal of a J-K flip-flop 47 the J and K terminals of which are connected to a positive voltage source. The Q terminal of flip-flop 47 is connected to the clock terminal of J-K flip-flop 48 the J and K terminals of which are also connected to the positive voltage source. After the first 1,000 counts into the three counters of counter 22, the Q and inverted Q terminals of flip-flop 47 will be operated. After the next 1,000 counts, the Q and inverted Q terminals of flip-flop 48 will be operated to produce the sensor signal to the Hi-Lo circuit 23.

The Q terminal of flip-flop 48 is connected to the J and K terminals of flip-flop 49 whereas the inverted Q terminal of flip-flop 48 is connected to the J and K terminals of J-K flip-flop 50. The signal from one shot multivibrator 28 over line 45 is supplied to the clock terminal of flip-flop 49 whereas the signal from one shot multivibrator 27 is supplied over line 44 to the clock terminal of flip-flop 50. The Q terminals of both flip-flops 49 and 50 are supplied to inputs of NOR circuit 51.

Under normal conditions, the Q terminals of both flip-flops 47 and 48 are at a logic level 0 whereas the inverted Q terminal of flip-flop 48 is a logic level 1. The Q terminals of both flip-flops 49 and 50 are at a logic level 0 whereas the output from NOR circuit 51 is at a logic level 1. Since the Q terminal of flip-flop 48 is normally a logic 0, the J-K terminals of flip-flop 49 will be a logic 0; and, since the inverted Q terminal of flip-flop 48 is normally a logic level 1 the J-K terminals of flip-flop 50 will normally be a logic 1.

The normal operating condition of the shaft speed monitoring circuit is where the output or sensor signal from counter 22 occurs, in time, between the reference signals emitted by counters 25 and 26 of FIG. I. The counter 26 establishes the upper limit which, if exceedd by the rotational speed of the shaft selected by selector 21, will result in an alarm condition. Thus, if the signal from counter 22 on line 100 occurs prior to the pulse from the counter 26 and one shot multivibrator 28, which is indicative of a shaft rotating too fast, the J-K terminals of flip-flop 49 will change to a logic level 1. Thereafter, upon receipt of the pulse from one shot 28, the Q terminal of flip-flop 49 will change from logic level 0 to logic level 1.

On the other hand, if the sensed shaft is rotating too slowly, the line 101 will remain at logic level 1. Thus, the pulse on line 44 will cause the Q terminal of flip-flop 50 to change from a logic level 0 to a logic level 1 and a pulse will be supplied through NOR circuit 51 to selector 110 and thus to the appropriate alarm indicator 31–40.

However, if the selected shaft is rotating at a proper speed, the pulse over line 45 will occur first having no effect on flip-flop 49 since its J and K terminals are 0.

Next, the Q and inverted Q terminals change stages resulting in a 1 on line 100 and a 0 on line 101. Finally, the pulse over line 44 will occur but will have no effect on flip-flop 50 since its J-K terminals are at logic level 0.

The down counter 25 establishes a lower limit for the rotational speed of the selected shaft. If the speed of that shaft falls below this limit, the NOR circuit 51 will provide an output to the selector circuit 110 to energize an appropriate alarm indicator. In FIG. II, a shaft rotating below the lower limit speed as established by the counter 25, results in a pulse occurring over line 44 prior to the line 101 switching to a logic level 0. When this is the case, since the J-K terminals of flip-flop 50 are at a logic level 1, a pulse over line 44 will result in the Q terminal switching from a logic level 0 to a logic level 1 resulting in an output pulse from NOR circuit 51.

The circuit in FIG. III is a detailed schematic diagram of the reference signal establishing means comprising the reference sensor 24, the down and up counter 25 and 26, one shot multivibrators 27, 28 and 41 and the deviation circuit 29. The down counter consists of counters 52, 53, 54 and 55 and a decoder arrangement consists of NOR circuits 56, 57, 58 and 59 the outputs of which are connected to the inputs of NAND 60. The up counter comprises counters 61, 62, 63 and 64 together with the decoding arrangement comprising NOR circuits 65, 66 and 67 the outputs of which are connected to the inputs of NAND circuit 68. The down counter arrangement receives its input from the reference sensor over a line 69 whereas the up counter arrangement receives its input from the reference sensor over line 70. The counters 52–55 and 61–64 may be obtained under the type number 74192. The deviation means 29 of FIG. I comprises two switch arrangements 71 and 72. The switch 71 is connected over inputs 73–76 of counter 52 and also over inputs 77–80 of counter 61. The outputs from switch 72 are connected over input 81–84 of counter 53 and also inputs 85–88 of the counter 62. The outputs from the switches 71 and 72 are also connected through resistors to the positive voltage source.

Since the base count of counter 22 is 1,000 before it supplies its output, the base count for the down counter 25 and the up counter 26 is also 1,000, down counter 25 must counnd down from 1,000 to zero to emit its output pulse and up counter 26 must count up from zero 1,000 to emit its output pulse. The switches 71 and 72, however, are designed to alter this basic 1,000 count to provide an output pulse from NAND circuits 60 and 68 after its associated counter has received a predetermined number of input pulses. Switches 71 and 72 act in unison to add an initial count to counters 52–55 and 61–64.

As an example, assume that switches 71 and 72 add the count of 52 to counters 52–55 and 61–64. Since counter 52–55 is a down counter, it is initially set at a count of 1,000 plus the count established by switches 71 and 72. Thus it must receive 1,052 in pulses before NAND 60 emits its output pulse. On the other hand, counter 61–64 is an up counter and is initially set at a zero count plus the count established by switches 71 and 72. Thus, up counter 61–64 must receive only 948 input pulses before NAND 68 emits its output pulse. When the outputs from counters 52–55 are all 0, the outputs from all NORs 56–59 will be 1. Thus, the output from NAND 60 will change from 1 to 0. Conversely, when the outputs from counters 61–63 are all 0, the outputs from all NORs 65–67 will be 1 which together with the 1 from counter 64 will change the output from NAND 68 from a 1 to a 0.

The output from NAND circuit 68 is normally a logic level 1. When the output of NAND 68 changes to a logic level 0, the one shot multivibrator 89 produces a pulse through inverter 90 to the line 44 shown in FIG. II. The resistor 91 and capacitor 92 established the time delay for one shot multivibrator 93 which is connected through inverter 94 to line 45 of FIG. II. To provide a reset signal, it is necessary that the pulse from one shot 95 be the last to occur.

Since the down counter generates the last reference signal, this signal is utilized to produce its reset signal. One shot multivibrator 95 is connected through inverter 96 to the output of NAND 60 and will only change its output state upon a negative pulse to its input. The output pulse from NAND circuit 60 is essentially a square pulse. On the downward swing of the pulse, one shot 93 is operated to provide the lower limit reference signal. This pulse is also inverted by inverter 96 and will appear on the input of one shot 95 as an upward swing pulse. When the pulse from NAND circuit 60 swings upward, the upward swing is converted by 96 and appears as a downward swing to the one shot 95 and will provide an output through inverter 97 to terminal 46. The output from one shot 95 is connected back over line 98 to the counters 52–55 and 61–64 to reset all counters. Resistor 99 and capacitor 100 establish the time delay of one shot multivibrator 93 and resistor 101 and capacitor 102 establish the time delay of one shot multivibrator 95.

The embodiments of the invention in which an exclusive property or right is claimed are defined as follows:

1. A plural shaft speed monitoring system comprising:
   means for producing a sensor signal relating to the speed of a selected shaft including
   plural sensor means for sensing the speed of said plural shafts, each sensor means for providing pulses the frequency of which is dependent upon the speed of its associated shaft,
   sensor selected means having a plurality of inputs each of which is connected to a sensor means and an output, said selector means for producing on its output the pulses from a selected sensor, and
   sensor counter means for providing said sensor signal upon receiving a predetermined number of input pulses from said selector means;
   means for producing at least one reference signal including
   reference speed pulse means for producing reference pulses, and
   reference counter means connected to said reference speed pulse means for providing said at least one reference signal upon receiving a predetermined number of reference pulses,
   comparator means connected to one of said counters for producing an error output whenever one of said signals occurs before the other, and
   output means for receiving said error output.

2. The plural shaft speed monitoring system of claim 1 wherein said alarm means comprises an alarm selector means and a plurality of alarm indicators each associated with an individual sensor means and wherein said system further comprises means for controlling the sensor selector means and the alarm selector means for insuring that an alarm indicator is placed in condition for energization with its associated sensor.

3. The plural shaft speed monitoring system of claim 1 wherein said reference counter comprises a down counter and an up counter for providing respectively lower limit and upper limit reference signals, said comparator means arranged to provide said error output to said alarm means when said sensor counter produces a pulse which does not fall between in time said reference signals.

4. The plural shaft speed monitoring system of claim 3 wherein said means connecting said down counter to said comparator means comprises a one shot multivibrator, said means connecting said up counter to said comparator means comprises a one shot multivibrator, said system further comprising a reset means also connected to said down counter for providing a reset signal to said up counter, to said down counter, to said sensor counter means and to said comparator means, said reset means comprising an inverter means and a one shot multivibrator.

5. The plural shaft speed monitoring system of claim 3 wherein said alarm means comprises an alarm selector means and a plurality of alarm indicators each associated with an individual sensor means and wherein said system further comprises means for controlling the sensor selector means and the alarm selector means for insuring that an alarm indicator is placed in condition for energization with its associated sensor.

6. The plural shaft speed monitoring system of claim 5 wherein said means for controlling both said selector means comprises a counter having an input connected to said down counter and having an output means connected to both said sensor selector means and said alarm selector means.

7. The plural shaft speed monitoring system of claim 6 wherein said comparator means comprises logic circuit means having a first input connected to said sensor counter, a second input connected from said down counter and a third input connected from said up counter and having an output means which is energized if said output from said sensor counter is received before said output from said up counter or after said output from said down counter.

8. The plural shaft speed monitoring system of claim 7 wherein said means connecting said down counter to said comparator means comprises a one shot multivibrator, said means connecting said up counter to said comparator means comprises a one shot multivibrator, said system further comprising a reset means also connected to said down counter for providing a reset signal to said up counter, to said down counter, to said sensor counter means and to said comparator means, said reset means to said sensor counter means and to said comparator means, said reset means comprising an inverter means and a one shot multivibrator.

* * * * *